July 18, 1967
JAMES E. WEBB
ADMINISTRATOR OF THE NATIONAL AERONAUTICS
AND SPACE ADMINISTRATION
3,331,951
TRIGONOMETRIC VEHICLE GUIDANCE ASSEMBLY WHICH ALIGNS THE THREE
PERPENDICULAR AXES OF TWO THREE-AXES SYSTEMS
Filed Feb. 20, 1963
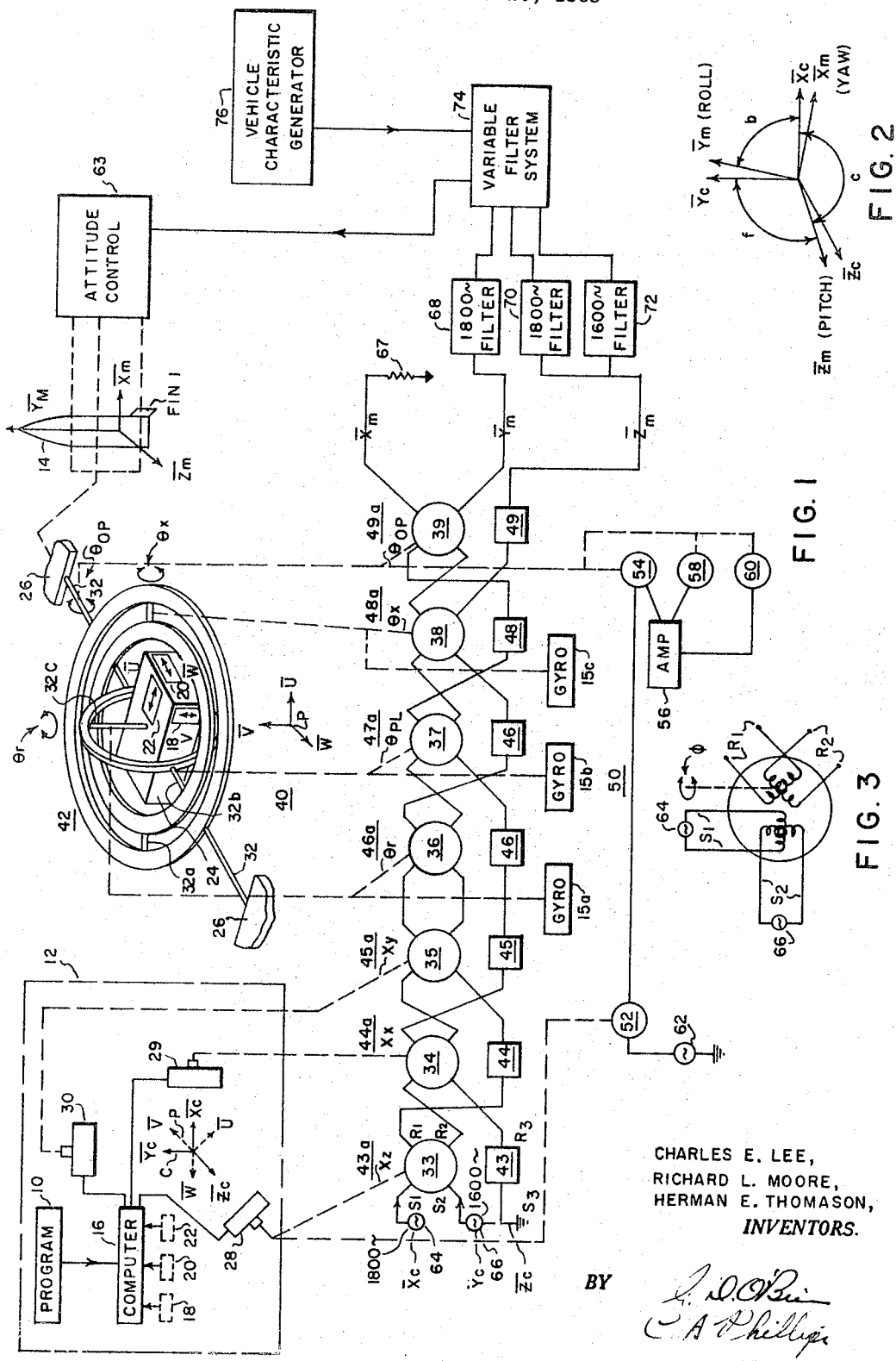
CHARLES E. LEE,
RICHARD L. MOORE,
HERMAN E. THOMASON,
INVENTORS.
BY
ATTORNEYS

United States Patent Office 3,331,951
Patented July 18, 1967

3,331,951
TRIGONOMETRIC VEHICLE GUIDANCE ASSEMBLY WHICH ALIGNS THE THREE PERPENDICULAR AXES OF TWO THREE-AXES SYSTEMS
James E. Webb, Administrator of the National Aeronautics and Space Administration, with respect to an invention of Herman E. Thomason, Charles E. Lee, and Richard L. Moore, Huntsville, Ala.
Filed Feb. 20, 1963, Ser. No. 260,087
12 Claims. (Cl. 235—150.25)

This invention relates to electrical and electro-mechanical techniques for trigonometric computation and is particularly related to a system of resolving the difference between two sets of three-axes coordinate references and for providing electrical voltages and control apparatus for bringing the coordinate references into coincidence.

It is an understatement to say that long-range missile guidance systems are at best complicated, costly, and demanding of cargo space and weight; and, unfortunately, these unfavorable factors appear to be following a trend of increase as demands for both accuracy and versatility increase. While substantial versatility, as it relates to vehicle maneuverability, is an established technique in the field of short range, remotely controlled or guided missiles flying at a speed of a few thousand miles per hour, this same versatility is not known to exist in the field of long range, purely inertially controlled, missiles or space vehicles traveling many times as fast.

Most efforts in the past which have been devoted to inertial guidance in missiles have been concerned with navigation between two points, normally on earth, with the trajectory between these points being within a single plane. We are now faced, however, with projected flight missions much more complex, as evidenced by current space programs that involve flights to and between orbital positions and in which the demands for precision of maneuvering have grown enormously.

It is thus an object of this invention to provide a new and improved trigonometric computation assembly and overall guidance system employing it, capable of rendering precision guidance for the most sophisticated of space flight missions, and, with a remarkable simplicity in component requirements.

This invention is, in general, directed to the solution of bringing the three perpendicular axes of two actual or one actual and the other computed or imaginary, three-axes systems (or frames) into actual or computed alignment. The context of discussion is an inertially guided space vehicle. One of the three-axes systems in accordance with the invention, is the body of the vehicle itself as oriented with respect to a stabilized platform assembly (P system) in which a platform is held in an inertial position by virtue of four gimbal suspensions, the outer suspension being contained in and affixed to the vehicle. Three of the four suspensions are about axes which are mutually perpendicular and the fourth suspension is about an axis which is redundant with respect to one of the other three axes. The gimbal angles of the gimbal suspension thus indicate the actual attitude of the vehicle with respect to a stable reference source, the platform. An example of the other three-axes system is a computer providing as outputs shaft positions corresponding to the angle which the axes of an imaginary three-gimbal suspended body (e.g., an imaginary vehicle positioned in a programmed position) would bear with respect to the axes of the stabilized or inertial platform. Alternately, the computer would provide electrical analogs of these shaft positions.

It is a particular feature of the invention that alignment error signals, indicating instructions for a vehicle attitude control, bringing the M system axes of an actual vehicle into coincidence with like axes of the C system, an imaginary program vehicle, are computed by a unique chain of sine-cosine resolvers. At least one resolver is responsive to each of the seven angular inputs from a program computer (3 inputs) and stable platform (4 inputs). It was discovered that one excellent mode of resolver interconnection connect the resolvers electrically in series and the computer driven resolvers precede electrically, the platform driven resolvers, with the order of computer resolvers being chosen inverse to the order of occurrence of platform resolvers. Order of resolvers in this instance refers to order of like gimbal drives to the resolvers as will be further discussed below.

At least one reference voltage is applied to the input (first resolver) of a resolver chain and the output of the chain contains three signals representative of instructions to the vehicle attitude control system appropriate to cause the vehicle to move an appropriate amount about a correct single axis to bring the vehicle in one maneuver to its commanded position. This will correspond to that position in which the basic gimbal axes angles of a stable platform with respect to the actual vehicle, and a computed position with respect to the platform are in coincidence.

As a further feature and embodiment of this invention all basic computation is obtained by a single resolver chain in which two sets of simultaneous computations are made by injecting through the resolver chain two signals differing in frequency and by selectively recapturing them at the output of the resolver chain.

A still further feature of this invention is the mode in which one redundant gimbal of a stabilized platform assembly is controlled to maintain a zero angle position of the other redundant gimbal. This is accomplished simply and accurately by a servo-loop between corresponding axes of the imaginary gimbal system of the computer and one of the redundant axes of the stabilized platform gimbal system in which the latter axis of rotation is controlled by the former.

Other objects and attendant advantages of the present invention will be apparent from the following detailed description when considered together with the accompanying drawings in which:

FIGURE 1 is a schematic illustration of an embodiment of the invention;

FIGURE 2 is a graphical illustration of a feature of operation of the invention, and FIGURE 3 is a schematic illustration of a sine-cosine resolver circuit in accordance with the invention.

Referring to the drawing, program device 10 of overall navigation computer 12 contains conventional means for providing on a continuous basis electrical signals representative of the trajectory a space vehicle 14 is to fly to accomplish a given flight mission. These signals are supplied program computer 16 of navigational computer 12 together with signals from accelerometers 18, 20 and 22, attached to stable platform 24. The accelerometer signals, after appropriate integration, provide signal information representative of the location in space at any instance of vehicle 14. Stable platform 24 is suspended by a four gimbal suspension system to fixed supports 26 of vehicle 14. Platform 24 is gyro stabilized in a conventional manner with gyro stabilized servo systems 15a, 15b and 15c. As illustrated, gyro system 15a drives platform gimbal angle $\theta_r$ (roll), gyro servo system 15b drives platform gimbal angle $\theta_{PL}$ (pitch limited) and gyro servo system 15c drives platform gimbal angle $\theta_x$ (yaw). This combination of gyro stabilization results in platform 24 being maintained with its coordinate "P" axes $\overline{V}$, $\overline{U}$, $\overline{W}$, in a fixed or inertial condition. Platform angle $\theta_{OP}$ (outer pitch) is driven in a manner to be described to maintain $\theta_{PL}$ in a steady state condition.

Program computer 16 determines from the signals applied to it the attitude, orientation in space, that vehicle 14 should display at that instant for a successful flight. If vehicle 14 is not properly oriented at the instant of measurement, as indicated by a navigation program from program device 10, computer 16 computes an appropriate attitude for vehicle 14 to assume in order to make up for this discovered error during the balance of the flight. This computed attitude may be considered in terms of angles $X_z$, $X_x$ and $X_y$ defining the orientation of command coordinate frame "C" having axes of unit vectors $\overline{Z}_c$, $\overline{X}_c$ and $\overline{Y}_c$ with respect to the stable platform inertial reference frame "P" having axes of unit vectors $\overline{W}$, $\overline{U}$ and $\overline{V}$. Angles $X_z$, $X_x$ and $X_y$ are manifested by the shaft outputs of motors 28, 29 and 30, respectively, which motors are energized by computer 16. Another approach to the understanding of angles $X_z$, $X_x$ and $X_y$ is to consider them as suggested above, as gimbal angles between a stable platform suspended by a simple three gimbaled assembly wherein the outer suspension of the gimbaled assembly is oriented to the correct or command, attitude or orientation desired of the vehicle.

The angle between the reference frame "C" of the correct attitude and the inertial reference frame "P" is termed a Euler angle and it is defined in terms of the angular rotations required to bring the two coordinate frames into coincidence and the sequence of the angular rotations. Here the angular rotations in their chosen sequence are first $X_z$, second $X_y$, and third $X_x$.

The order of rotation of these angles, the angular outputs of motors 28, 29 and 30 is opposite to the order of corresponding gimbal angles of stabilized platform 24, when counted from fixed mounts 26 into stabilized platform 24, that is first about conventional gimbal or axial suspension 32 (angle $\theta_{OP}$), second about axial suspension 32a (angle $\theta_x$), third about axial suspension 32b (angle $\theta_{PL}$) and fourth about axial suspension 32c (angle $\theta_r$).

Seven sine-cosine resolvers 33 through 39 making up resolver chain 40, are electrically connected in series, wth the order of shaft connections from the chain to navigational computer 12 and overall stabilized platform assembly 42 following the order of rotation of shaft outputs of navigational computer 12, as previously defined, for the first three resolvers in series, and the inverse (inside to outside) gimbal order of the shaft outputs of stabilized platform assembly 42 for the last four resolvers in series in resolver chain 40. Accordingly, shaft angle $X_z$ is representative of a shaft position of resolver 33, $X_x$ of resolver 34, $X_y$ of resolver 35, $\theta_r$ of resolver 36, $\theta_{PL}$ of resolver 37, $\theta_x$ of resolver 38, and $\theta_{OP}$ of resolver 39, where:

$\theta_r$ = Roll gimbal angle
$\theta_{PL}$ = Pitch limited gimbal angle
$\theta_x$ = Yaw gimbal angle
$\theta_{OP}$ = Outer pitch gimbal angle Resolver chain 40 also includes seven identical impedance matching elements 43 through 49 and each presents a transfer impedance (from an input winding to an output winding oriented for maximum coupling) corresponding to one of resolvers 33 to 39. Resolvers 33 through 39 are of the general type described in Marner Patent 2,723,800 and shown in FIGURE 3 in which there are two stator windings ($S_1$ and $S_2$) at right angles to each other and two rotor windings ($R_1$ and $R_2$) which are at right angles to each other. A resolver and impedance matching element, as for example, resolver 33 and impedance matching element 43 make up a resolver element and there are, accordingly, seven of such resolver elements, 43a through 49a. Considering one of resolver elements 43a and labeling the inputs of stator windings S1, S2, and S3 and outputs of rotor windings, R1, R2, and R3, an expression for the computations performed is as follows:

$E_{R1} = E_{S1} \sin \phi + E_{S2} \cos \phi + 0 E_{S3}$
$E_{R2} = E_{S1} \cos \phi - E_{S2} \sin \phi + 0 E_{S3}$
$E_{R3} = 0 E_{S1} + 0 E_{S2} + 1 E_{S3}$ where, as is to be distinguished from the teaching of Marner:

$E_{S1}$ is first alternating current input of a first frequency applied to $S_2$.
$E_{S2}$ is a second alternating current input and of a second frequency, applied to $S_2$.
$E_{S3}$ is a third input, applied to $S_3$.
$E_{R1}$ is a first resulting output, at $R_1$.
$E_{R2}$ is a second resulting output, at $R_2$.
$E_{R3}$ is a third resulting output, at $R_3$.
$\phi$ is the angular difference between stator winding $S_1$ and rotor winding $R_1$ and between stator winding $S_2$ and rotor winding $R_2$.

One requirement of the system of this invention is that angle $\theta_{PL}$ be held to a zero angle steady state condition. In accordance with the invention this is accomplished by maintaining angle $\theta_{OP}$ identical to angle $X_z$ by means of servo system 50.

Servo system 50 consists of a synchro transmitter 52 driven by motor 28 and is thus aligned with angle $X_z$ applied to the rotor of resolver 33. An electrical output of synchro transmitter 52 is applied to synchro receiver 54 which follows gimbal angle $\theta_{OP}$, and a signal representative of any difference in angular position between synchro transmitter 52 and synchro receiver 54 is supplied to the input of amplifier 56. The output of amplifier 56 driven motor 60 which in turn drives gimbal suspension 32 to produce coincidence between $X_z$ and $\theta_{OP}$. Tachometer 58 provides electrical inverse feedback in a conventional manner from the shaft of synchro receiver 54 to amplifier 56 to damp the response of servo system 50 and thus enhanced stability. Servo system 50 is fed a reference alternating current signal in a conventional manner from source 62.

To examine the arrangement and operation of resolver chain 40, a reference signal representative of unit vector $\overline{X}_c$ is applied to a first input stator winding $S_1$ of resolver 33 and is supplied from 1800 cycle alternating current source 64. A second input signal to resolver chain 40, representative of unit vector $\overline{Y}_c$ is applied from 1600 cycle alternating current source 66 to a second stator winding $S_2$ of resolver 33. Still a third input, representative of unit vector $\overline{Z}_c$ and of zero value is applied to input winding $S_3$ of impedance matching element 43. The three inputs form the input to resolver element 43a.

The output of resolver element 43a is provided from output windings $R_1$, $R_2$, and $R_3$ with windings $R_2$ being first and second rotor windings of resolver 33 and $R_3$ being an output winding of impedance matching element 43. Impedance matching elements 43 through 49 are included as circuit element in resolver chain 40 whenever an output of a resolver is not directly fed to the next resolver in the chain; for example, the output of winding $R_1$ of resolver 33 bypasses resolver 34 and is thus fed through impedance matching element 44 to the $S_2$ input of resolver 35. Tracing the interconnections of resolver chain 40, the $R_2$ output of resolver 33 is connected to the $S_1$ input of resolver 34 and the $R_2$ output of impedance matching element 43 is connected to the $S_2$ input of resolver 34. The $S_1$, $S_2$, $S_3$, $R_1$, $R_2$, and $R_3$ designations are labeled only with respect to resolver element 43a as each resolver element is identical. The $R_1$ output of resolver 34 is connected through impedance matching elements 45 and 46 to the $S_2$ input of resolver 37 and the $R_2$ output of resolver 34 connected to the $S_1$ input of resolver 35. The $R_1$ output of resolver 35 is connected to the $S_1$ input of resolver 36 and the $R_2$ output of resolver 36 is connected to the $S_2$ input of resolver 36. The $R_1$ output of resolver 36 is connected through impedance matching element 47 to the $S_2$ input of resolver 37. The $R_1$ output of resolver 37 is connected through impedance matching element 48 to the $S_1$ input of resolver 39 and the $R_2$ output of resolver 37 is connected to the $S_1$ input of resolver 38. The $R_1$ output of resolver 38 is connected to the $S_2$ input of resolver 39 and the $R_2$ output of resolver 38 is connected through impedance matching element 49 as a resolver chain output $\bar{Z}_m$. Resolver chain output $\bar{X}_m$ appears as an output $R_1$ of resolver 39, and output $\bar{Y}_m$ appears as an output $R_2$ of resolver 39.

The function of resolver chain 40 is to compare the program position of vehicle 14 as described by navigation computer 12 to the actual position of vehicle 14 as described by the platform gimbal angles of stabilized platform assembly 42 and supply attitude control 63 with the information that it needs to turn the vehicle into the position described by computer 12 at the shaft outputs of motors 28, 29 and 30. To understand the manner which resolver chain 40 performs its function it is perhaps best to review the kinematics involved.

First, a set of cartesian coordinates made up of unit vectors $\bar{X}_m$, $\bar{Y}_m$ and $\bar{Z}_m$ is constructed where, as illustrated in FIGURE 1, $X_m$ is perpendicular to the longitudinal axis of vehicle 14 and passes through fin 1, $\bar{Y}_m$ is along the longitudinal axis of vehicle 14, and $$\bar{Z}_m = \bar{X}_m \times \bar{Y}_m$$

and is the vector or cross product $\bar{X}_m \times \bar{Y}_m$. Rotation about $\bar{X}_m$ is yaw, about $\bar{X}_m$ is roll, and about $\bar{Z}_m$ is pitch. This is the M or vehicle coordinate frame or system, and is illustrated in FIGURE 2. A second set of cartesian coordinates making up a C or command coordinate frame as illustrated in navigational computer 12 is made up of unit vectors $\bar{X}_c$, $\bar{Y}_c$ and $\bar{Z}_c$. In addition these unit vectors are represented by reference electrical inputs to resolver element as previously stated. They are representative of the axes of the command position of the imaginary vehicle described by navigation computer 12 and $\bar{X}_c$ is through fin 1, $\bar{Y}_c$ is along the longitudinal axis and $\bar{Z}_c = \bar{X}_c \times \bar{Y}_c$ of the imaginary vehicle.

A third set of cartesian coordinates, illustrative of stable platform 24, are labeled $\bar{U}$, $\bar{V}$ and $\bar{W}$ and make up the inertial or P system. The orientation of these vectors to an observer on earth is established by the platform erection system prior to liftoff. A likely orientation at some time (T), prior to liftoff is $\bar{U}$ coincident with $\bar{X}_m$, $\bar{V}$ coincident with $\bar{Y}_m$, and $\bar{W}$ coincident with $\bar{Z}_m$. The "P" system ($\bar{U}$, $\bar{V}$, and $\bar{W}$) is the invariant inertial reference to which all motions are referred after liftoff. The origin of M, C, and P are coincident.

Referring to FIGURE 2 showing both the C and M coordinate systems, resolver chain 40 must provide signals representative of the error existing between the M and C coordinate systems appropriate for attitude control of vehicle 14 to bring the M and C coordinate systems into coincidence. In accordance with this invention the error signals developed are representative of the cosines of angles $b$, $c$, and $f$. As illustrated in FIGURE 2, angle $b$ is the angle between $\bar{X}_c$ and $\bar{Y}_m$, angle $c$ is between $\bar{X}_c$ and $\bar{Z}_m$ and angle $f$ is between $\bar{Y}_c$ and $\bar{Z}_m$. Coincidence between the M and C coordinate systems and thus correct vehicle attitude is achieved when each of these three angles is 90 degrees.

Angular information relative to the relation of the vehicle or M coordinate system with respect to the P or inertial coordinate system is applied from stabilized platform assembly 42 to resolver chain 40. Examining stabilized platform assembly 42 and starting from the inside, the gimbal angles are $\theta_r$ (roll), $\theta_{PL}$ (pitch limited), $\theta_x$ (yaw), and $\theta_{OP}$ (outer pitch). As stated above, prior to liftoff, $\bar{U}$ is=$\bar{X}_m$, $\bar{V}=\bar{Y}_m$, and $\bar{W}=\bar{Z}_m$. Angle $\theta_r$ is then about the $\bar{V}$ and $\bar{Y}_m$ axes, $\theta_{PL}$ and $\theta_{OP}$ are about the $\bar{W}$ and $\bar{Z}_m$; and $\theta_x$ is about the $\bar{U}$ and $\bar{X}_m$ axes. The angle $\theta_r$, $\theta_{PL}$, $\theta_{OP}$ and $\theta_x$ describe the relation that exists between the P or inertial and M or vehicle coordinate system or coordinate frame. From matrix algebra this may be expressed as follows, wherein each matrix is labeled in terms of the corresponding resolver element:

$$\begin{vmatrix} \bar{X}_m \\ \bar{Y}_m \\ \bar{Z}_m \end{vmatrix} = \overset{49a}{\begin{vmatrix} \cos\theta_{OP} & -\sin\theta_{OP} & 0 \\ \sin\theta_{OP} & \cos\theta_{OP} & 0 \\ 0 & 0 & 1 \end{vmatrix}} \overset{48a}{\begin{vmatrix} 1 & 0 & 0 \\ 0 & \cos\theta_x & -\sin\theta_x \\ 0 & \sin\theta_x & \cos\theta_x \end{vmatrix}} \overset{47a}{\begin{vmatrix} \cos\theta_{PL} & -\sin\theta_{PL} & 0 \\ \sin\theta_{PL} & \cos\theta_{PL} & 0 \\ 0 & 0 & 1 \end{vmatrix}} \overset{46a}{\begin{vmatrix} \cos\theta_r & 0 & \sin\theta_r \\ 0 & 1 & 0 \\ -\sin\theta_r & 0 & \cos\theta_r \end{vmatrix}} \begin{vmatrix} U \\ V \\ W \end{vmatrix}$$

Which may be written as:

$$|M| = \overset{49a}{|\theta_{OP}|} \overset{48a}{|\theta_x|} \overset{47a}{|\theta_{PL}|} \overset{46a}{|\theta_r|} |P|$$

These matrices give the M coordinates in P.

The three angles which are the output of the navigation computer 12 ($X_z$, $X_x$ and $X_y$) may be thought of as imaginary gimbal angles of an imaginary gimbal system connecting the command position vehicle to the platform as shown in FIGURE 1.

When the program is zero in navigation computer 12, $X_z$ is in the $\bar{Z}_c$ or $\bar{W}$ direction, $X_x$ is in the $\bar{U}$ or $\bar{X}_c$ direction and $X_y$ is in the $\bar{V}$ or $\bar{Y}_c$ direction. To express the P or inertial coordinate in terms of the C or command coordinates and in terms of the resolver elements which accomplish this expression the following equation from matrix algebra is set forth:

$$\begin{vmatrix} \bar{U} \\ \bar{V} \\ \bar{W} \end{vmatrix} = \overset{45a}{\begin{vmatrix} \cos X_y & 0 & \sin X_y \\ 0 & 1 & 0 \\ -\sin X_y & 0 & \sin X_y \end{vmatrix}} \overset{44a}{\begin{vmatrix} 1 & 0 & 0 \\ 0 & \cos X_x & -\sin X_x \\ 0 & \sin X_y & \cos X_x \end{vmatrix}} \overset{43a}{\begin{vmatrix} \cos X_z & -\sin X_z & 0 \\ \sin X_z & \cos X_z & 0 \\ 0 & 0 & 1 \end{vmatrix}} \begin{vmatrix} \bar{X}_c \\ \bar{Y}_c \\ \bar{Z}_c \end{vmatrix}$$

Which may be written:

$$|P| = \overset{45a}{|\bar{X}_y|} \overset{44a}{|\bar{X}_x|} \overset{43a}{|\bar{X}_z|} |C|$$

Combining Equations 3 and 4:

$$|M| = |\theta_{OP}|\overset{49a}{}|\theta_X|\overset{48a}{}|\theta_{PL}|\overset{47a}{}|\theta_r|\overset{46a}{}|\overline{X}_y|\overset{45a}{}|\overline{X}_x|\overset{44a}{}|\overline{X}_z|\overset{43a}{}|c|$$

Solving the matrix of the last equation it may be expressed as follows:

$$\begin{vmatrix}\tilde{X}_m \\ \tilde{Y}_m \\ \tilde{Z}_m\end{vmatrix} = \begin{vmatrix}\overset{1800}{\cos a} & \overset{1600}{\cos d} & \overset{0}{-\cos g} \\ -\cos b & \cos e & \cos h \\ \cos c & -\cos f & \cos k\end{vmatrix}|c|.$$

where, from analytical geometry cosines $a$ through $h$ and cosine $k$ are the direction cosines between the 6 vectors $\overline{X}_m, \overline{Y}_m, \overline{Z}_m, \overline{X}_c$ and $\overline{Z}_c$, and angle $a$ is between $\overline{X}_c$ and $\overline{X}_m$, $b$ is between $\overline{X}_c$ and $\overline{Y}_m$, $c$ is between $\overline{X}_c$ and $\overline{Z}_m$, $d$ is between $\overline{Y}_c$ and $\overline{X}_m$, $e$ is between $\overline{Y}_c$ and $\overline{Y}_m$, $f$ is between $\overline{Y}_c$ and $\overline{Z}_m$, $g$ is between $\overline{Z}_c$ and $\overline{X}_m$, $h$ is between $\overline{Z}_c$ and $\overline{Y}_m$, and $k$ is between $\overline{Z}_c$ and $\overline{Z}_m$. As illustrated in the last equation, the top row of terms are present in the resolver chain output $\overline{X}_m$, the second row in the output $\overline{Y}_m$, and the bottom row in the output $\overline{Z}_m$. The first column indicates that the terms therein appear at a frequency of 1800 cycles, the second column indicates 1600 cycle terms, and the last column zero frequency terms.

Referring to the matrix above and back to FIGURE 2, wherein it was shown that the angles of interest were angles $b$, $c$, and $f$, it will be noted that $-\cos b$ is available at output $\overline{Y}_m$ at a frequency of 1800 cycles, $\cos c$ is available at the output of $\overline{Z}_m$ at 1800 cycles, and $-\cos f$ available at the output $\overline{Z}_m$ at 1500 cycles. Output $\overline{X}_m$ is unused otherwise than to terminate it in impedance matching resistor 67.

Signal selection of the desired cosine outputs is obtained by passing resolver output $\overline{Y}_m$ through 1800 cycle narrow band-pass filter 68, a resolver output $\overline{Z}_m$ through 1800 cycle narrow band-pass filter 70 and an output $\overline{Z}_m$ also through 1500 cycle narrow band-pass filter 72. Accordingly, $-\cos b$ is now available alone at the output of filter 68, $\cos c$ similarly available at the output of filter 70, and $-\cos f$ similarly available at the output of filter 72. The outputs of filter 68, 70, and 72 are then filtered in filter system 74 wherein compensations for natural mode vibrations of vehicle 14 are achieved to prevent undesired control effects in a correctional manner. Filter system 74 is controlled in a known manner by vehicle characteristic generator 76, which takes into account the precise characteristic generator 76 together are not features of this invention and are not illustrated in detail.

After being filtered by filter system 74, $-\cos b$, $\cos c$ and $-\cos f$ signals are fed to a conventional vehicle attitude control 63, for example, the motor gimbal control of vehicle 14 in which the $-\cos b$ signal is applied as a pitch error signal, the $\cos c$ signal is applied as roll error signal and the $-\cos f$ signal is applied as a yaw error signal. As shown in FIGURE 2, the pitch or $-\cos b$ signal produces corrective rotations of pitch about vehicle axis $\overline{Z}_m$, the roll or $\cos c$ signal produces corrective rotation about roll axis $\overline{Y}_m$ and the yaw or $-\cos f$ signal produces corrective rotation about yaw axis $\overline{X}_m$. Correct alignment of the vehicle coordinate system "M" with the command coordinate system "C" is produced when angles $b$, $c$ and $f$ are precisely 90°, at which point, of course, the cosines of these angles will be zero and thus no further corrective commands are applied.

In addition to the features of the invention previously enumerated, this invention is particularly adaptable to provide further system reliability if needed. This is achieved by redundancy of computation through making $\overline{Z}_c$ of finite value and of a frequency other than that of $\overline{X}_c$ and $\overline{Y}_c$. The three outputs of resolver chain 40 are then filtered to achieve the following individual outputs: An $\overline{X}_m$ output of the modulation of $\overline{Y}_c$, an $\overline{X}_m$ output of modulation of $\overline{Z}_c$, a $\overline{Y}_m$ output of the modulation of $\overline{X}_c$, a $\overline{Y}_m$ output of the modulation of $\overline{Z}_c$, a $\overline{Z}_m$ output of the modulation of $\overline{X}_c$, and a $\overline{Z}_m$ output of the modulation of $Y_c$. These individual outputs represent, in the order listed, pitch error, roll error, pitch error, yaw error, roll error, and yaw error. Thus, it will be seen that there are two outputs representative of each error signal and thus if any one of the frequency channels is interrupted due, for example, to oscillator failure or a resolver winding failure, the system as a whole will continue to function properly.

It is also possible to omit impedance matching element 43 and connect the $\overline{Z}_c$ input directly to the $S_2$ input of resolver 34, and to employ a single resolver of the type illustrated in FIGURE 3 for each two succeeding impedance matching elements 45–49. In which case their shaft positions would be positioned appropriate to provide the same coupling as in the case of impedance matching elements 44–49.

Obviously, many modifications and variations of the present invention are possible in the light of the above teachings. It is, therefore, to be understood that within the scope of the appended claims the invention may be practiced other than as specifically described.

What is claimed is:
1. In combination:
(A) reference means representative of a first three-perpendicular axes frame;
(B) program means including:
    (1) means representative of a second three-perpendicular-axes frame having an origin coincident with the origin of said first axes frame;
    (2) first computation means for providing first, second, and third program outputs representative of the angular position and sequence of rotations that the three axes of said second reference frame must be rotated through to achieve coincidence of like axes of said first and second axes frames;
(C) attitude following means connected to said reference means and including means representative of a third three-perpendicular-axes frame having an origin coincident with the origin of said first and second axes frames;
(D) inertially stabilized suspension means interconnecting said reference means and said following means and including first, second, third, and fourth axial suspension means wherein:
    (1) said first axial suspension means interconnects said reference means and said second axial suspension means and provides a first axis of suspension and provides a fourth designated follow- er output representative of angular position of rotation about said first axis;

(2) said second axial suspension means interconnects said first axial suspension means and said third axial suspension means and provides a second axis of suspension perpendicular to said first axis of suspension and fifth designated follower output representative of angular position of rotation about said second axis;

(3) said third axial suspension means interconnects said second and fourth axial suspension means and provides a third axis of suspension perpendicular to said second axis of suspension and a sixth designated follower output representative of position of rotation about said third axis; and (4) said fourth axial suspension mean interconnects said third axial suspension means and said attitude following means and provides a fourth axis of suspension perpendicular to said third axis of suspension and a designated seventh follower output representative of position of rotation about said fourth axis;

(E) servo means responsive to said first program output of said first computation means for maintaining identity between the angular position of rotation of said first program output of said second reference frame and the angular position of rotation of said fourth axis of suspension, preventing rotation about said second axis of said second axial suspension means as said attitude following means varies in program attitude;

(F) second computation means responsive to said outputs of said first computation means and said stabilized suspension means for computing error signals representative of the misalignment of said third axis frame with respect to said second axis frame; and (G) attitude control means responsive to said second computation means and operatively connected between said second computation means and said attitude following means for changing the attitude of said attitude following means in a direction to produce coincidence of said second and third axes frames.

2. In combination:
(A) reference means representative of a first three-perpendicular-axes frame;
(B) program means including:
   (1) means representative of a second three-perpendicular-axes frame having an origin coincident with the origin of said first axes frame;
   (2) first computation means for providing first, second, and third program outputs representative of the angular position and sequence of rotations that the three axes of said second reference frame must be rotated through to achieve coincidence of like axes of said first and second axes frames;
(C) attitude following means connected to said reference means and including means representative of a third three-perpendicular-axes frame having an origin coincident with the origin of said first and second axes frames;
(D) inertially stablized suspension means interconnecting said reference means and said following means and including first, second, third, and fourth axial suspension means wherein:
   (1) said first axial suspension means interconnects said reference means and said second axial suspension means and provides a first axis of suspension and provides a fourth designated follower output representative of angular position of rotation about said first axis;
   (2) said second axial suspension means interconnects said first axial suspension means and said third axial suspension means and provides a second axis of suspension perpendicular to said first axis of suspension and fifth designated follower output representative of angular position of rotation about said second axis;
   (3) said third axial suspension means interconnects said second and fourth axial suspension means and provides a third axis of suspension perpendicular to said second axis of suspension and a sixth designated follower output representative of position of rotation about said third axis; and
   (4) said fourth axial suspension means interconnects said third axial suspension means and said attitude following means and provides a fourth axis of suspension perpendicular to said third axis of suspension and a designated seventh follower output representative of position of rotation about said fourth axis;
   (5) wherein each two successively numbered axes of suspension lie in the same plane;
(E) servo means responsive to said first program output of said first computation means for maintaining identity between the angular position of rotation of said first program output of said second reference frame and the angular position of rotation of said fourth axis of suspension, preventing rotation about said second axis of said second axial suspension means as said attitude following means varies in program attitude;
(F) second computation means responsive to said outputs of said first computation means and said stabilized suspension means for computing error signals representative of the misalignment of said third axis frame with respect to said second axis frame; and
(G) attitude control means responsive to said second computation means and operatively connected between said second computation means and said attitude following means for changing the attitude of said attitude following means in a direction to produce coincidence of said second and third axes frames.

3. The combination set forth in claim 1 wherein said second computation means comprises first through seven resolving means and wherein:
(A) each said resolving means responsive to an angular input provides output signals representative of the sine and cosine of said angular input;
(B) first through third said resolving means being responsive to like numbered program outputs of said first computation means;
(C) fourth through seventh said resolving means being responsive to like numbered outputs of said suspension means.

4. The combination set forth in claim 3 wherein said fourth through seventh said resolving means each comprise at least one electromechanical resolver wherein each said resolver comprises:
(A) a mechanical shaft position input, first and second 90° displaced electrical input windings and first and second 90° displaced output windings;
(B) said input windings being movable with respect to said output windings in response to movement of said mechanical shaft;
(C) said outputs of said suspension means being a mechanical output providing rotational movement to said mechanical shafts of said fourth through said seventh resolving means.

5. The combination set forth in claim 4. wherein said first through third resolving means each comprises at least one said electromechanical resolver.

6. The combination set forth in claim 5 wherein each resolving means comprises a like numerically designated single said resolver, and;

(A) first reference signal $\overline{X}_c$ is applied to said first input winding of said first resolver;

(B) a second reference signal $\overline{Y}_c$, differing in frequency from $\overline{X}_c$ but of the same amplitude, is applied to said second input winding of said first resolver, a reference potential of zero potential being applied through a first impedance matching element to said second input of said second resolver;

(1) said first impedance matching element comprising impedance means for presenting a transfer impedance corresponding to the unity coupling transfer impedance of one of said resolvers;

(C) said first output winding of said third resolver being connected to said first input winding of said fourth resolver and said second output winding of said third resolver being connected to said second input winding of said fourth resolver;

(D) said first output winding of said second resolver being connected through second and third of said impedance matching element to said second input winding of said fifth resolver;

(E) said second input winding of each of resolvers 1–2, 4–5, being connected to said first input winding of the next higher numbered resolver;

(F) said first output winding of said first resolver being connected through one of said impedance matching elements to said second input winding of said third resolver and said first output winding of said fourth resolver being connected through one of said impedance matching elements to said second input winding of said sixth resolver;

(G) said first output winding of said fifth resolver being connected through one of said impedance matching elements to said first input winding of said seventh resolver and the first output winding of said sixth resolver being connected to said second input winding of said seventh resolver;

(H) said first output winding of said seventh resolver being terminated in a matching impedance;

(I) said second output winding of said seventh resolver providing an output signal $\overline{Y}_m$;

(J) said second output winding of said sixth resolver providing through one of said impedance matching elements an output $\overline{Z}_m$;

(K) first filter means responsive to $\overline{Y}_m$ for passing only a signal frequency of $\overline{X}_c$ and providing a first of said error signals;

(L) second filter means responsive to $\overline{Z}_m$ for passing only a signal frequency of $\overline{X}_c$ and providing a second of said error signals; and (M) third filter means responsive to $\overline{Z}_m$ for passing only a signal frequency of $\overline{Y}_c$ and providing a third of said error signals.

7. In combination:
(A) reference means representative of a first three-perpendicular-axes frame;
(B) program means including:
    (1) means representative of a second three-perpendicular-axes frame having an origin coincident with the origin of said first axes frame;
    (2) first computation means for providing first, second, and third program outputs representative of the angular position and sequence of rotations that the three axes of said second reference frame must be rotated through to achieve coincidence of like axes of said first and second axes frames;
(C) attitude following means connected to said reference means and including means representative of a third three-perpendicular-axes frame having an origin coincident with the origin of said first and second axes frames;
(D) inertially stabilized suspension means interconnecting said reference means and said following means and including first, second, third, and fourth axial suspension means wherein;
    (1) said first axial suspension means interconnects said reference means and said second axial suspension means and provides a first axis of suspension and provides a fourth designated follower output representative of angular position of rotation about said first axis;
    (2) said second axial suspension means interconnects said first axial suspension means and said third axial suspension means provides a second axis of suspension perpendicular to said first axis of suspension and fifth designated follower output representative of angular position of rotation about said second axis;
    (3) said third axial suspension means interconnects said third axial suspension means and said means and provides a third axis of suspension perpendicular to said second axis of suspension and a sixth designated follower output representative of position of rotation about said third axis; and
    (4) said fourth axial suspension means interconnects said second and fourth axial suspension attitude following means and provides a fourth axis of suspension perpendicular to said third axis of suspension and a designated seventh follower output representative of position of rotation about said fourth axis;
(E) second computation means operatively connected to said attitude following means and responsive to said outputs of said first computation means and said stabilized suspension means for computing error signals representative of the misalignment of said third axis frame with respect to said second axis frame.

8. In combination:
(A) reference means representative of a first three-perpendicular-axes frame;
(B) program means including:
    (1) means representative of a second three-perpendicular-axes frame having an origin coincident with the origin of said first axes frame;
    (2) first computation means for providing first, second, and third program outputs representative of the angular position and sequence of rotations that the three axes of said second reference frame must be rotated through to achieve coincidence of like axes of said first and second axes frames;
(C) attitude following means connected to said reference means and including means representative of a third three-perpendicular-axes frame having an origin coincident with the origin of said first and second axes frames;
(D) stabilized suspension means interconnecting said reference means and said following means and including first, second, third, and fourth axial suspension means wherein;
    (1) said first axial suspension means interconnects said reference means and said second axial suspension means and provides a first axis of suspension and provides a fourth designated follower output representative of angular position of rotation about said first axis;
    (2) said second axial suspension means interconnects said first axial suspension means and said third axial suspension means and provides a second axis of suspension perpendicular to said first axis of suspension and fifth designated follower output representative of angular position of rotation about said second axis;
    (3) said third axial suspension means interconnects said second and fourth axial suspension means and provides a third axis of suspension perpendicular to said second axis of suspension and a sixth designated follower output representative of position of rotation about said third axis;

(4) said fourth axial suspension means interconnects said third axial suspension means and said attitude following means and provides a fourth axis of suspension perpendicular to said third axis of suspension and a designated seventh follower output representative of position of rotation about said fourth axis;

(5) means for driving rotationally said fourth axial suspension means to prevent rotation of said second axial suspension means;

(E) second computation means operatively connected to said attitude following means and responsive to said outputs of said first computation means and said stabilized suspension means for computing error signals representative of the misalignment of said third axis frame with respect to said second axis frame.

9. In combination:
(A) reference means representative of a first three-perpendicular-axes frame;
(B) program means including:
   (1) means representative of a second three-perpendicular-axes frame having an origin coincident with the origin of said first axes frame;
   (2) first computation means for providing first, second, and third program outputs representative of the angular position and sequence of rotations that the three axes of said second reference frame must be rotated through to achieve coincidence of like axes of said first and second axes frames;
(C) attitude following means connected to said reference means and including means representative of a third three-perpendicular-axes frame having an origin coincident with the origin of said first and second axes frames;
(D) stabilized suspension means interconnecting said reference means and said following means and including first, second, third, and fourth axial suspension means wherein;
   (1) said first axial suspension means interconnects said reference means and said second axial suspension means and provides a first axis of suspension and provides a fourth designated follower output representative of angular position of rotation about said first axis;
   (2) said second axial suspension means interconnects said first axial suspension means and said third axial suspension means and provides a second axis of suspension perpendicular to said first axis of suspension and fifth designated follower output representative of angular position of rotation about said second axis;
   (3) said third axial suspension means interconnects said second and fourth axial suspension means and provides a third axis of suspension perpendicular to said second axis of suspension and a sixth designated follower output representative of position of rotation about said third axis;
   (4) said fourth axial suspension means interconnects said third axial suspension means and said attitude following means and provides a fourth axis of suspension perpendicular to said third axis of suspension and a designated seventh follower output representative of position of rotation about said fourth axis;
   (5) means for driving rotationally said fourth axial suspension means to prevent rotation of said second axial suspension means;
(E) second computation means responsive to said outputs of said first computation means and said stabilized suspension means for computing error signals representative of the misalignment of said third axis frame with respect to said second axis frame;
(F) attitude control means responsive to said second computation means and operatively connected between said second computation means and said attitude following means for changing the attitude of said attitude following means in a direction to produce coincidence of said second and third axes frames.

10. In combination:
(A) an electromechanical resolver comprising:
   (1) a set of first and second input windings positioned 90° with respect to each other;
   (2) a set of first and second output windings positioned 90° with respect to each other;
   (3) means for rotating one of said set of windings with respect to said other set;
(B) first means for producing an alternating current having a first frequency, said first means being coupled to said first input winding;
(C) second means for producing an alternating current having a second frequency substantially different from said first frequency, said second means being coupled to said second input winding;
(D) at least one filter means responsive to at least one said output winding for selectively passing at least one of said frequencies, whereby two output signals, having said first and second frequencies, respectively, are separated.

11. In combination:
(A) an electromechanical resolver comprising:
   (1) a set of first and second input windings positioned 90° with respect to each other;
   (2) a set of first and second output windings positioned 90° with respect to each other;
   (3) means for rotating one of said set of windings with respect to said other set;
(B) first means for producing an alternating current having a first frequency, said first means being coupled to said first input winding;
(C) second means for producing an alternating current having a second frequency substantially different from said first frequency, said second means being coupled to said second input winding;
(D) first filter means responsive to said first output winding for selectively passing said first frequency;
(E) second filter means responsive to said second output winding for selectively passing said second frequency;
(F) whereby two output signals, having said first and second frequencies, respectively, are separated.

12. In combination:
(A) a plurality of electromechanical resolvers interconnected electrically in a chain and wherein each said resolver comprises:
   (1) a set of first and second input windings positioned 90° with respect to each other;
   (2) a set of first and second output windings positioned 90° with respect to each other;
   (3) means for rotating one of said set of windings with respect to said other set;
(B) at least one output of any one of said resolvers being connected to one input of any resolver following it successively in said chain;
(C) first means for producing an alternating current having a first frequency, said first means being coupled to said first input winding of the first resolver in said chain;
(D) second means for producing an alternating current having a second frequency substantially different from said first frequency, said second means being coupled to said second input winding of the first resolver in said chain;

(E) at least one filter means responsive to at least one said output winding of one of said resolvers for selectively passing at least one of said frequencies, whereby two output signals, having said first and second frequencies, respectively, are separated.

References Cited

UNITED STATES PATENTS

| | | | |
|---|---|---|---|
| 2,723,800 | 11/1955 | Marner | 235—186 |
| 2,996,268 | 8/1961 | Brown et al. | 235—150.25 X |
| 3,004,708 | 10/1961 | Cunningham | 235—189 |
| 3,049,294 | 8/1962 | Newell | 235—150.25 |
| 3,214,575 | 10/1965 | Seliger et al. | 235—150.25 |

OTHER REFERENCES

Resolver Handbook, Reeves Instrument Company (RICO Bulletin #57), 1954, pages 1–6.

MALCOLM A. MORRISON, *Primary Examiner.*

I. KESCHNER, *Assistant Examiner.*